US012607244B2

(12) United States Patent
Werner et al.

(10) Patent No.: US 12,607,244 B2
(45) Date of Patent: Apr. 21, 2026

(54) VALVE AND METHOD OF MAKING SAME

(71) Applicant: Vibracoustic SE, Darmstadt (DE)

(72) Inventors: Philipp Werner, Lüneburg (DE);
Michael Weber, Buchholz (DE)

(73) Assignee: Vibracoustic SE, Weinheim (DE)

( * ) Notice: Subject to any disclaimer, the term of this
patent is extended or adjusted under 35
U.S.C. 154(b) by 365 days.

(21) Appl. No.: 18/112,071

(22) Filed: Feb. 21, 2023

(65) Prior Publication Data

US 2023/0265906 A1 Aug. 24, 2023

(30) Foreign Application Priority Data

Feb. 23, 2022 (DE) .................... 10 2022 104 245.6

(51) Int. Cl.
*F16F 9/348* (2006.01)
*F16F 9/34* (2006.01)

(52) U.S. Cl.
CPC ............ *F16F 9/3482* (2013.01); *F16F 9/341*
(2013.01); *F16F 9/3415* (2013.01); *F16F*
*2226/045* (2013.01)

(58) Field of Classification Search
CPC ............. F16F 9/348–3488; F16F 9/341; F16F
9/3415; F16F 9/43; F16F 9/02; F16F
2226/045; B60G 2500/204
See application file for complete search history.

(56) References Cited

U.S. PATENT DOCUMENTS

| | | | |
|---|---|---|---|
| 2017/0023087 A1* | 1/2017 | Zeissner | ................. F16F 9/348 |
| 2019/0195376 A1 | 6/2019 | Kaufmann | |
| 2022/0178470 A1 | 6/2022 | Schwarz | |

FOREIGN PATENT DOCUMENTS

| | | | |
|---|---|---|---|
| CN | 2093284 U1 | 1/1992 | |
| DE | 10062789 A1 | 7/2002 | |
| DE | 10 2011 114 570 B4 | 4/2013 | |
| DE | 102016010641 A1 | 3/2018 | |
| DE | 102020132840 A1 | 6/2022 | |

OTHER PUBLICATIONS

Extended European Search Report for EP23154611.0-1009 Jul. 24,
2023 (7 pages), with English machine translation.
German Office Action, DE10 2022 104 245.6, dated Sep. 14, 2022
(with translation).

* cited by examiner

*Primary Examiner* — David R Morris
(74) *Attorney, Agent, or Firm* — Fishman Stewart PLLC

(57) ABSTRACT

A valve for an air spring includes a housing member having
a center axis and channel. The housing member includes first
and second elements connected by a materially engaging
connection in a first region and in abutment with or directly
beside each other in a second region. A sealing member may
be disposed in the channel and can close the channel or
reduce an effective opening cross section. The valve may
comprise a channel element that at least partially guides or
forms the channel. The channel element may be fixed in the
housing member in a form-fit and/or force-fit manner, and
the channel element may retain the sealing member in a third
region or the channel element may be fixed in/on the first
element in a form-fit and/or force-fit manner, and the chan-
nel element may retain the sealing member in a third region.

13 Claims, 5 Drawing Sheets

VALVE AND METHOD OF MAKING SAME

CROSS-REFERENCE TO RELATED APPLICATIONS

This application claims priority to German Patent Application No. DE 10 2022 104 245.6, filed Feb. 23, 2022, the contents of which are hereby incorporated by reference in its entirety.

TECHNICAL FIELD

The invention relates to a valve and a method for the production thereof.

BACKGROUND

Valves for filling a space are known in practice. For example, such valves may be associated with an air spring volume of an air spring and enable or prevent an air flow into the air spring volume.

Air springs can keep a vehicle at a constant level, regardless of how heavily it is loaded. They can enable a vehicle to be lowered at high speeds in order to improve the aerodynamics and consequently the range. Air springs can also optimise the air flow below the vehicle for passive battery cooling in electric vehicles. They protect the batteries in poor road conditions and always ensure a minimum ground clearance. When used as a suspension for utility vehicle cabs, air springs can keep the cab at a constant level regardless of the inherent weight or the loading state of the cab. Since the brakes in utility vehicles are pneumatically operated, the compressors for the compressed air supply in utility vehicles are significantly more powerful than compressors used in passenger transport. If the compressor intended for the brake supply is also used for the compressed air supply of the air spring, compressed air may be provided at sufficient quantities but the system is rather characterised by a robust nature and not by small pressure fluctuations.

The use of valves in air springs is known, for example, from DE 10 2011 114 570 B4. The valves are in this instance used to introduce air from an air supply into an air spring volume and to discharge air from the air spring volume into an environment.

From practice, a valve is further known for an air spring and comprises a housing member which has a channel, wherein the housing member comprises a first element and a second element. These two elements are connected in a first region by means of a weld seam and are in abutment with each other in a second region. In the channel, there is arranged a resilient sealing member which can close the channel. In this valve, the sealing member is clamped between the first element and the second element with a clamping force, wherein this clamping force is produced by means of assembly clamping forces which are applied to both members while they are welded to each other in the first region. The assembly clamping forces determine the clamping force, the welding fixes the clamping force. However, this construction is problematic.

This is because the weld seam must not only thereby produce the sealing of the system, but it is also loaded with the clamping force. This leads to the cooling of the weld seam having to be continued to such an extent that the clamping force can be maintained by the weld seam. Cooling times after the welding thereby have to be taken into account before the external assembly clamping forces can be released by the two housing elements. In addition, the weld seam is permanently loaded during operation by the clamping force of the sealing member, which increases the risk of a leakage in the case of an imperfect configuration of the weld seam.

Furthermore, this construction requires during the production of the individual housing elements a complex sliding tool since transversely extending throughflow openings cannot be produced with a simple "opening/closing tool". In particular, throughflow openings which are optimised in technical flow terms can only be constituted conditionally since the geometries have to be produced by pulling a sliding tool. Undercuts, as would be conceivable, for example, by rounding openings at the inner side of the opening in order to prevent flow noises or whistling noises cannot be produced with such a tool concept.

SUMMARY

An object of the invention is therefore to provide a valve of which production can be carried out in a more cost-effective and robust manner, wherein an improved securing of the sealing member should further be provided.

The main features of the invention are set out in the present disclosure.

According to the invention, a valve for an air spring is proposed, comprising a housing member through which a longitudinal center axis extends and which comprises a channel, wherein the housing member comprises a first element and a second element which are connected by means of a materially engaging connection in a first region and which are in abutment with each other in a second region or which are arranged directly beside each other, wherein there is arranged in the channel a sealing member which can close the channel or reduce the effective opening cross section of the channel, wherein the valve comprises a channel element which at least partially guides or forms the channel, wherein either the channel element is fixed in the housing member in a form-fit and/or force-fit manner and the channel element retains the sealing member in a third region between the channel element and the second element, or the channel element is fixed in or on the first element in a form-fit and/or force-fit manner and the channel element retains the sealing member in a third region between the channel element and the first element.

According to the invention, the channel element is provided to retain the sealing member and the channel element is additionally fixed according to the invention in a form-fit and/or force-fit manner. This fixing is free from a material bond, that is to say, the sealing member is retained at least partially, preferably completely by this form-fit and/or force-fit fixing. Consequently, this fixing then also determines the retention force and clamping force by means of which the sealing member can be retained and clamped in position.

The channel element in this instance overcomes several problems of the prior art at the same time.

The channel element is a separate component, for example, with regard to the first and second elements of the housing. The channel element which supports the sealing member can thereby be produced in a simple manner, for example, with an "opening/closing tool" and more complex channel geometries can be produced, for example, with undercuts with respect to the longitudinal center axis. Consequently, a greater freedom of design with respect to throughflow openings or the configurations thereof is achieved in order to prevent potential flow noises. An "opening/closing tool" is intended to be understood to be a cast form, for example, for plastics material injection-moulding which has no separate insert, sliding member, folding core, etcetera.

Furthermore, since a materially engaging fixing or weld seam on the channel element can be dispensed with, the disadvantages linked with such a materially engaging fixing do not occur at all.

Furthermore, since the channel element retains the sealing member, a fixing of the first element to the second element has no influence at all on a clamping force for the sealing member. Therefore, the first element and the second element can be connected to each other in a materially engaging, cost-effective and durable manner, for example by means of a weld seam and adhesive bonding. This also leads to sealing. Conversely, however, the clamping force also has no influence on this materially engaging connection. Since the materially engaging connection does not also have to apply the clamping force at the same time, the process for producing the materially engaging connection, such as a weld connection, is configured to be more rapid and robust. The materially engaging connection may be a weld seam since it can be introduced in a simple manner and is durable and has good sealing properties. The materially engaging connection may be an adhesive connection since it can be produced in a simple manner and is durable and has good sealing properties.

Two alternatives are proposed in this instance, wherein both lead to the same advantages.

It is conceivable for the first element to form or have a flow inlet and/or the second element or a third element to form or have a flow outlet. As a result of functional integration, these components can thereby lead to a valve which is optimised in terms of structural space. The channel may be arranged between the flow inlet and flow outlet. The channel may guide a fluid path. The regions mentioned may be different regions. The valve may be a pressure retention valve as advantages according to the invention are evident therein. The valve comprises the sealing member. The sealing member may be a residual pressure retention sealing member, preferably a diaphragm. The sealing member may be constructed in a disc-like or annular-disc-like manner. The first element, the second element, the third element, the sealing member and/or the channel element may be separately produced components. The first element and/or the second element and/or the third element may be (a) housing element(s).

It is conceivable for the channel element to be formed from a plastic material, preferably from a thermoplastic material, preferably by means of injection-moulding. A channel element with a complex geometry can thereby be produced in a simple and cost-effective manner. In addition, the plastics material, as a result of its inherent material resilience, is particularly suitable for being fixed in a form-fit and/or force-fit manner as a result of its own resilient deformation. The channel element can therefore be latched or engaged in a simple manner.

According to a further development of the valve according to the invention, the channel element may have at least at one of the outer sides thereof a channel portion which guides or forms the channel and/or the channel element with respect to the longitudinal center axis may have at least one undercut. The outer side of the channel element may be a front side or a circumferential side. The channel element enables a simple production and at the same time complex geometries without costly production tools having to be used for this purpose. It is conceivable for the channel portion to be delimited at the circumferential side by the channel element and by the first and/or second element, preferably in a cross sectional plane or longitudinal sectional plane with respect to that of the channel portion or the guided fluid path thereof. The channel portion thereby does not have to be formed by the channel element over the entire circumference thereof. Portions which are adjacent to the channel element can also form the channel portion, whereby structural space can be saved.

According to a further development of the valve according to the invention, the channel element may be constructed in a disc-like or annular manner. In this instance, the height of the channel element may be considerably smaller than the outer diameter thereof. The channel element can thereby also be configured to be optimised in terms of structural space and may also be able to be placed in a typically circular hole, for example, in the second element.

According to a further development of the valve according to the invention, the channel element may at least on one of the outer sides thereof have a locking groove or a locking projection and a fixing partner for the channel element may have the other element from the locking groove and locking projection, wherein the locking groove and locking projection engage in each other in a fixing manner, such as in a manner that the sealing member is thereby retained in the third region. Preferably, the locking groove or the locking projection is arranged on the outer circumference of the channel element, preferably continuously. Preferably, the locking groove or the locking projection is arranged on the inner circumference of the first and/or second element, preferably continuously. By means of this groove/projection connection or locking connection, the channel element can be engaged in a simple manner, for which no complex method step is required. It has been found that such a fixing is sufficient to retain the sealing member in a satisfactory manner and at the same time to assemble it in the simplest manner possible. The fixing partner may, for example, be the first or second element.

According to a conceivable further development of the valve according to the invention, the locking projection may be formed integrally with the channel element or fixing partner, that is to say, in one piece and/or in a materially uniform manner. This reduces production costs. However, it is also conceivable for the locking projection to be formed from a different material from the channel element or fixing partner, for example, from an elastomer material. The locking projection can thereby have not only a fixing action, but also a sealing action.

According to a conceivable further development of the valve according to the invention, the channel element may have a channel portion which is constructed in the form of a circle segment, circle sector or circular ring portion in cross section. In the portion of the circular ring or the circular ring portion form, the outer delimiting circular ring may be the outer circumference of the channel element and/or the inner delimiting circular ring may be the inner circumference of the channel element, the passage and/or the central space or the portion of the circular ring may be surrounded completely by the material of the channel element, or the wall of the channel portion may be formed completely by the material of the channel element. The circle segment form, the circle sector form or the circular ring form may extend with respect to the longitudinal center axis over an angle range of 180°, preferably 90°. Preferably, this channel portion extends parallel with the outer circumference of the channel element. These configurations of the channel portion produce a structural resilience of the channel element. Consequently, the channel element can be further improved in order to be fixed by means of inherent resilient deformation in a form-fit and/or force-fit manner. The channel element can therefore, for example, be locked in a simple manner.

According to a further development of the valve according to the invention, the locking groove may be a circle-segment-like groove, a V-shaped groove or a groove of triangular form in longitudinal section and/or the locking projection may be a circle-segment-like locking projection, a V-shaped locking projection or a locking hook in longitudinal section. Advantageously, the corresponding groove and the corresponding locking projection form a locking pair. These geometries can be produced in a simple manner but are at the same time suitable for ensuring a permanent retention of the sealing member and a definition of the clamping force.

According to a further development of the valve according to embodiments of the invention, the channel element may have a passage via which or in which an annular collar can protrude, wherein the annular collar may have a sealing face which may adjoin the sealing member. The annular collar is surrounded by the valve, preferably the first element has the annular collar. The passage may extend along, preferably parallel or concentrically relative to, the longitudinal center axis through the channel element. It is thereby possible for the sealing member which can be arranged at one side of the channel element to be able to adjoin the annular collar which can be arranged at the opposing side of the channel element. It is conceivable for the sealing member to be normally closed, that is to say, to be in sealing abutment with the annual collar in the absence of external action of force.

According to a further development of the valve according to the invention, the second element may have an internally circumferential first portion having a first diameter in which the first element is arranged, preferably in abutment against a first surface, and/or the second element has an internally circumferential second portion having a second diameter in which the channel element is arranged, preferably in abutment against a second surface. It is also conceivable for the second element to have an internally circumferential portion having a diameter in which the preferably pre-assembled sub-assembly comprising the sealing member, channel element and first element is arranged, preferably in abutment against a face. The second element may thus be constructed in a stepped manner, wherein the respective shoulders and faces may act as auxiliary assembly devices and/or auxiliary positioning members in order during assembly to define an end position. The assembly is thereby simplified considerably and additional position-indicating devices which are certainly obligatory in the prior art can be dispensed with. Particularly when the first element abuts against the first surface, no force has to be applied in an axial direction to the housing member in order to secure a materially engaging connection between the first and second housing portions. The two diameters are therefore advantageously different. In order to form a valve which is optimised in terms of structural space, it is conceivable for both portions to directly adjoin each other in an axial direction. The portions additionally have another advantage. Since they delimit the installation depth of the first element, it can in any case be prevented that an excessively deep introduction of the first element into the corresponding portion leads to a force which changes the clamping force for the sealing member in an undesirable manner being introduced into the channel element.

According to a further development of the valve according to the invention, the channel element may be recessed in the direction of the longitudinal center axis with respect to the first surface or at the most be flush therewith and/or both elements may abut each other in a pressure-free manner, preferably in the second region and/or the first element and the channel element may abut each other in a pressure-free manner. It is also conceivable for the channel element to abut in a pressure-free manner against the second element, wherein this is particularly advantageous in the construction of a sub-assembly with the channel element and the first element. In this instance, the respective advantage of each configuration is also concentrated on not changing the clamping force for the sealing member and on the fact that the materially engaging connection, when it is produced, for example, during curing in the case of an adhesive connection or solidification in the case of a weld connection, must not be loaded by the clamping force in an axial direction. Instead, the materially engaging connection may regardless of axial forces also continue to be formed uninterrupted outside any apparatuses or outside the assembly installation. Shorter cycle times within the assembly installations are thus possible. Furthermore, the quality of the materially engaging connection is significantly less dependent on cycle time.

According to a further development of the valve according to the invention, the channel element may have a central space, wherein the central space at least partially guides or forms the channel, wherein the central space is preferably open with respect to the first and/or second element and/or is selectively intended to be opened, wherein the central space is preferably arranged coaxially relative to the longitudinal center axis. The central space has the advantage that the channel element and the first element thereby do not have to have a defined orientation with respect to each other. The channel portion which originates from the first element can in a simple manner lead into the central space, completely irrespective of the mutual angular position of the channel element and the first element with respect to the longitudinal center axis. A channel portion may protrude from the central space, preferably at an angle with respect to the longitudinal center axis. The passage may at least partially form the central space.

According to a conceivable further development of the valve according to the invention, the first element, the third element, the sealing member and/or the channel element may be constructed in a rotationally symmetrical manner with respect to an axis, preferably the longitudinal center axis, preferably in a rotationally symmetrical manner in the mathematically nar-rower sense. A rotation about any angle is reproduced by the first/third element, the sealing member and/or the channel element on itself. Geometrically simple components can thereby be produced in a cost-effective manner, wherein neither the assembly nor the end position thereof after assembly may be relevant.

According to a conceivable further development of the valve according to the invention, the channel element and/or the first element may have a receiving member for the sealing member. The position of the sealing member can thereby be determined during pre-assembly or assembly and slippage can thereby be prevented.

According to a conceivable further development of the valve according to the invention, the first element may have a support ring against which the channel element can abut. The channel element can thereby be constructed in a filigree manner since it can be supported by the support ring. The support ring may have the receiving member for the sealing member. The support ring may be arranged at the circumferential side of the annular collar. Between the annular collar and support ring, an annular space which at least partially guides or forms the channel may be formed.

According to a conceivable further development of the valve according to the invention, the first element, the channel element and the sealing member which is retained therebetween in the third region may form a sub-assembly. This sub-assembly and the pre-assembly thereof independently of and outside the second element affords the advantages of a modular construction type since this one sub-assembly can be used for a large number of differently configured second elements without being changed.

According to the invention, a method for producing a valve according to the disclosure is proposed, comprising the following steps:

provided a first element, a second element, a sealing member and a channel element, connecting in a form-fit and/or force-fit manner the channel element to one of the two elements in such a manner that the sealing member is retained between the channel element and the corresponding one of the two elements in a third region, connecting the other element of the two elements to the element to which the channel element is connected by means of a materially engaging connection in a first region, wherein the two elements are in abutment with each other in a second region or are arranged directly adjacent to each other.

The advantages already described above with regard to the valve are also evident in a similar manner for the method to which reference is hereby made.

It is conceivable that according to a first alternative during the assembly the sealing member can be introduced separately from the channel element into the housing member or into the second element, wherein the channel element can then subsequently be attached or introduced separately from the sealing member. The channel element is subsequently fixed in a form-fit and/or force-fit manner and retains the sealing member in the third region. A stacked assembly of both components takes place in this instance. It is also conceivable for the sealing member to be arranged initially on or in the channel element during a pre-assembly in order to form a sub-assembly. Subsequently, this sealing member/channel element sub-assembly can be fixed in a form-fit and/or force-fit manner in the housing member or in the second element in order to retain the sealing member in the third region. Subsequently, the first element can be arranged in or on the housing member or the second element and be connected in a materially engaging manner thereto, for example, by means of a weld seam.

It is conceivable that, according to a second alternative, a pre-assembly in order to form a sub-assembly can be carried out in such a manner that the sealing member as a result of the form-fit and/or force-fit fixing of the channel element on or in the first element is retained in the third region between the channel element and the first element. A sub-assembly comprising the sealing member, the channel element and the first element can thereby be initially formed. This sub-assembly can then be arranged in or on the housing member or second element and connected to the housing member or the second element, for example, by means of a weld seam.

Other features, details and advantages of the invention will be appreciated from the wording of the claims and from the following description of embodiments with reference to the drawings.

DETAILED DESCRIPTION

Figure 1:
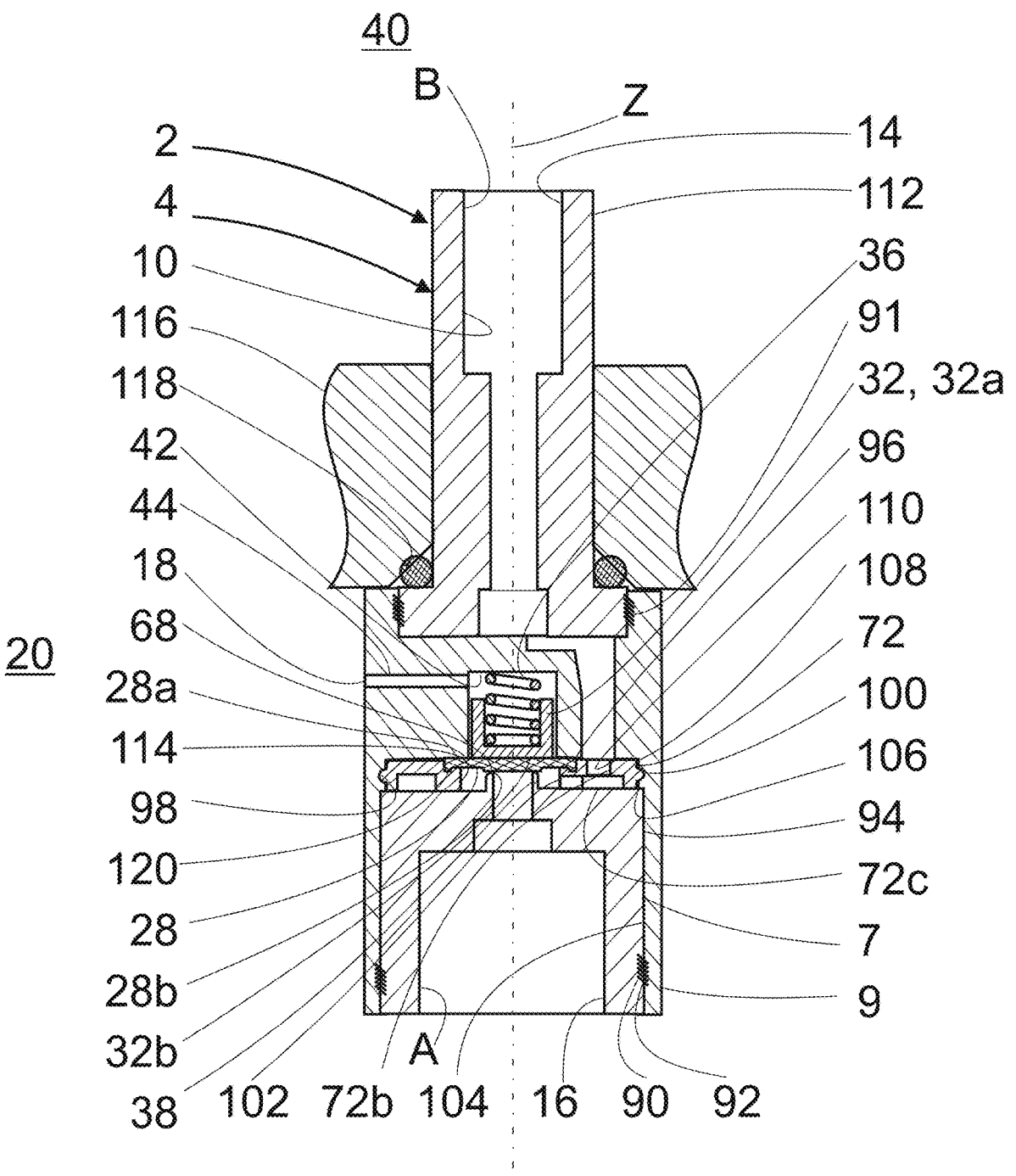
FIG. 1 generally illustrates a longitudinal sectioned view of a valve of a first embodiment according to aspects and teachings of the invention.

In the Figures, mutually corresponding or identical elements are given the same reference numerals and are therefore generally not described again unless advantageous. Features which have already been described are not described again in order to avoid repetition and can be applied to all elements with identical or mutually corresponding reference numerals, as long as they are not explicitly excluded. The disclosures contained in the overall description can be transferred accordingly to identical components with the same reference numerals or the same component names. The position indications selected in the description, such as, for example, top, bottom, side, etcetera, also relate to the Figure which has just been described and illustrated and are accordingly intended to be transferred to the new position in the event of a positional change. Furthermore, individual features or feature combinations from the different embodiments described and shown may also represent solutions which are independent per se, inventive or in accordance with the invention.

FIG. 1 shows a central longitudinal sectioned view of a valve 2 according to aspects and teachings of a first embodiment in the form of a pressure retention valve.

The valve 2 comprises a housing member 4 through which a longitudinal center axis Z extends. The housing member 4 comprises a first element 7, a second element 9 and a third element 112 (housing elements). The first element 7 is connected to the second element 9 by means of a weld seam 90 which is formed in a first region 92. This weld seam 90 seals the valve 2. In a second region 94, the two elements 7, 9 may be in abutment with each other or be arranged directly adjacent to each other. The third element 112 is connected to the second element 9 by means of a weld seam 91. This weld seam 91 seals the valve 2. The first element 7 forms or has a flow inlet A and the third element 112 forms or has a flow outlet B. Depending on the direction of the fluid flow or the fluid path, the flow inlet A and flow outlet B may also be transposed. In addition, the first element 7 has a second valve opening 16 and the third element 112 has a first valve opening 14. Between the valve openings 14, 16 a channel 10 leads through the housing member 4 which guides a fluid path. The first valve opening 14 may be fluidically able to be connected to an air spring volume 40. The first element 7 has an annular collar 38 which protrudes at the end face. At the end face, the annular collar 38 has a sealing face 68. The second element 9 has a counter-pressure space 42 which is connected via an auxiliary channel 44 to a third valve opening 18. The counter-pressure space 42 can thus be fluidically connected to an environment 20 of the valve 2.

The valve 2 additionally comprises a disc-like sealing member 28 which is arranged in the channel 10. The sealing member 28 can selectively close the channel 10 or reduce the effective opening cross section of the channel 10. The sealing member 28 is a residual pressure retention sealing member in the form of a diaphragm. The sealing member 28 has a first active face 28a and a second active face 28b. The sealing member 28 is in sealing abutment with the sealing face 68 of the annular collar 38 in the absence of external application of force—the channel 10 is closed.

The valve 2 further comprises an annular-disc-like channel element 72 which is in the form of a plastics material injection-moulded component. At the outer circumference, the channel element 72 has a locking projection 100 which is circle-segment-like and continuous when viewed in longitudinal section and which is constructed integrally with the channel element 72 and engages in a form-fit manner in a locking groove 98 which is arranged at the inner circumference and which is circle-segment-like and continuous when viewed in longitudinal section in the second element 9 in order to fix the channel element 72 via the locking connection. The second element 9 is in this instance the fixing partner. The channel element 72 has a passage 102 in which the annular collar 38 engages. The passage 102 extends along and concentrically with respect to the longitudinal center axis Z through the channel element 72. The channel element 72 additionally comprises a central space 114 which is delimited at the outer circumference by the passage 102, at the inner circumference by the annular collar 38, axially at one end by the sealing member 28 and axially at the other end by the first element 7. The central space 114 is arranged coaxially with respect to the longitudinal center axis Z. The central space 114 partially guides the channel 10 and is open in the direction towards the first element 7 or is intended to be opened via the sealing member 28. From the central space 114, a channel portion 72c protrudes at right-angles with respect to the longitudinal center axis Z. The channel portion 72c guides or forms the channel 10 at least partially and is arranged on an end-face outer side of the channel element 72. It can be seen that the channel portion 72c is delimited at the circumference by the channel element 72 and the first element 7. Beside the channel portion 72c, the channel element 72 additionally has another channel portion 72b which is adjacent in fluid terms to the channel portion 72c. The channel portion 72b is constructed in the form of a circle segment, circle sector or circular ring portion in cross section, for which reason the outer circumference of the channel element 72 can be pressed resiliently radially inwards in order to achieve the form-fit fixing. The wall of the channel portion 72b is formed completely by the material of the channel element 72.

The sealing member 28 is retained in a third region 96 between the channel element 72 and the second element 9 by the locking connection. This locking connection determines the clamping force of the sealing member 28. For the sealing member 28, the channel element 72 has a receiving member 120.

The second element 9 has at the inner circumference a first portion 104 having a first diameter in which the first element 7 is arranged. The first element 7 is in this instance in abutment with a first surface 106. The second element 9 additionally has an internally circumferential second portion 108 having a second diameter in which the channel element 72 is arranged. The channel element 72 may be in abutment with a second face 110.

The channel element 72 is arranged in the direction of the longitudinal center axis Z at the most flush with the first surface 106. The first element 7 and the channel element 72 are in abutment with each other in a pressure-free state in the same manner as the first element 7 and the second element 9.

In the counter-pressure space 72, there is arranged an actuator 32 which can be dis-placed along the longitudinal center axis Z. To this end, it is guided in a floating manner by the second element 9. The actuator 32 has a hollow-cylindrical portion 32a which serves to guide it and is arranged in the counter-pressure space 42. The actuator 32 additionally has a base portion 32b. The actuator 32 can therefore be referred to as being configured in a pot-like manner. The base portion 32b is in abutment with the active face 28a of the sealing member 28. In the counter-pressure space 42, a spring 36 is additionally arranged as a force storage member. The spring 36 is of the helical pressure spring type. The spring 36 is supported at one end on the actuator 32 or the base portion 32b thereof and at the other end on the second element 9. The sealing member 28 is therefore pretensioned counter to the resilient force of the spring 36 in the closure position against the annular collar 38. Lifting off the sealing face 68 on the annular collar 38 is carried out by means of pressure on the active face 28b and counter to this resilient force and where applicable additionally counter to the pressure applied in the counter-pressure space 42.

The valve 2 is inserted into a component 116 which is not described in greater detail, wherein a sealing ring 118 is arranged between them. The component 116 may, for example, be an air spring.

Figure 2:
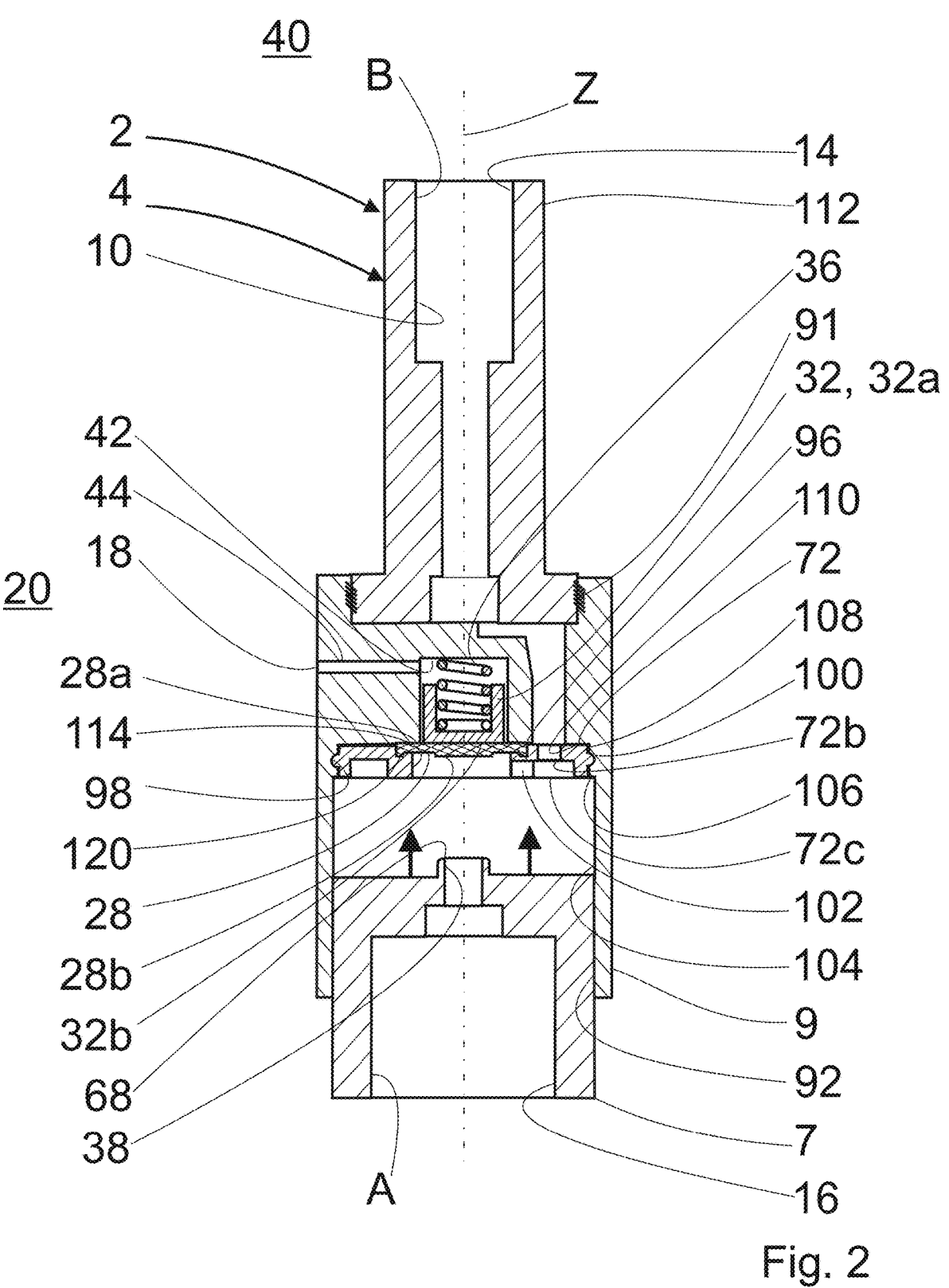
FIG. 2 generally illustrates a production step of the valve of the first embodiment.

FIG. 2 shows a production step of a production method of the valve 2 of FIG. 1.

A "sealing member 28/channel element 72 sub-assembly" was preassembled outside the second element 9 and then mounted in the second element 9 by the locking connection. The channel element 72 is subsequently fixed in a form-fit and/or force-fit manner and retains the sealing member 28 in the third region 96. At this time, the retention force is applied and the clamping force of the sealing member 28 is subsequently determined. It is now shown that only afterwards is the first element 7 inserted along the arrows into the second element 9 and after completed positioning against the face 106 is welded to the second element 9. The weld seam 90 is thereby formed.

Figure 3:
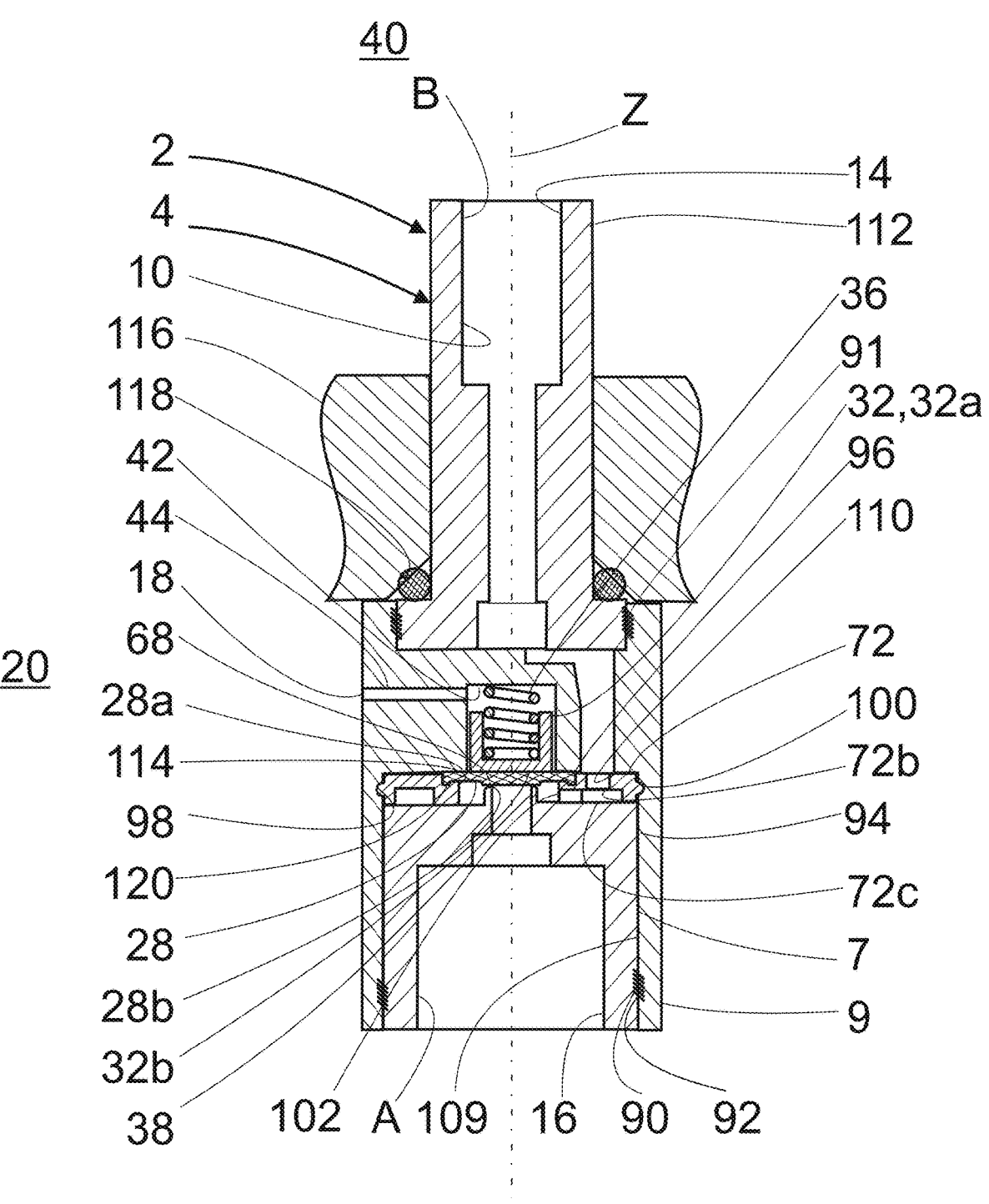
FIG. 3 generally illustrates a longitudinal sectioned view of a valve of a second embodiment according to aspects and teachings of the invention.

FIG. 3 shows a central longitudinally sectioned view of a second embodiment of a valve 2 according to aspects and teachings of the invention in the form of a pressure retention valve.

In order to avoid repetition, only the differences with respect to FIG. 1 are intended to be described below for FIG. 3. Features which are not described should so to speak be considered to be disclosed and described.

It can be seen that the second element 9 is now configured at the inner circumference no longer in a stepped manner, but instead only has a portion 109 with a diameter for the channel element 72 and the first element 7. Also in this instance, the first element 7 and the channel element 72 are in abutment with each other in a pressure-free manner in order not to change the determined clamping force of the sealing member 28.

Figure 4:
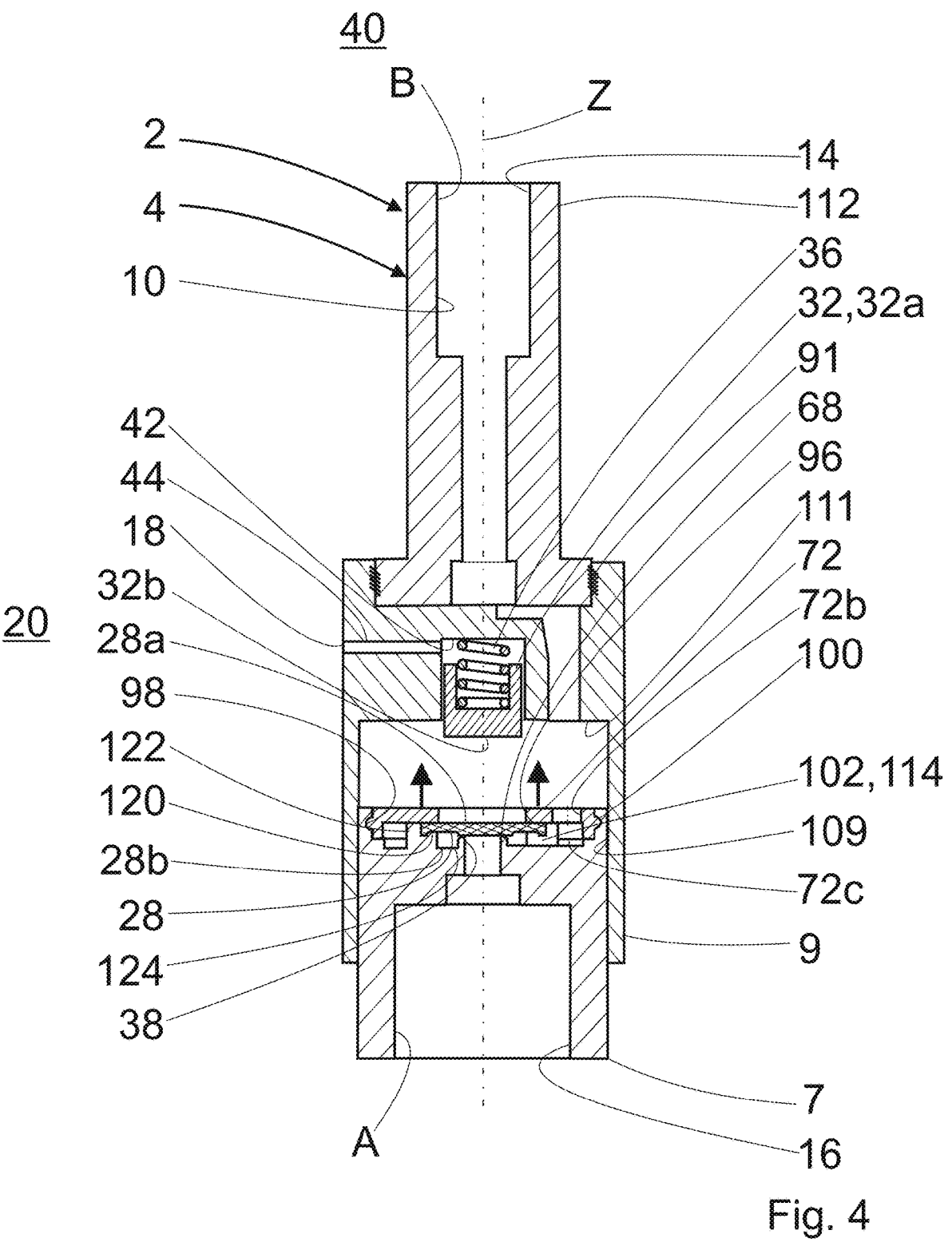
FIG. 4 generally illustrates a production step of a valve of a third embodiment according to aspects and teachings of the invention, and FIG. 5 generally illustrates a longitudinal sectioned view of the valve of a third embodiment according to aspects and teachings of the invention.

FIG. 4 shows a production step from a production method of a third embodiment of a valve 2 according to aspects and teachings of the invention in the form of a pressure retention valve.

In order to avoid repetition, only the differences of FIG. 4 with respect to FIG. 1 are intended to be described below. Features which are not described should be considered to be disclosed and described.

The channel element 72 is now fixed by means of the locking connection no longer to the second element 9, but instead to the first element 7. The first element 7 is in this instance the fixing partner. In addition, the sealing member 28 is now retained between the channel element 72 and the first element 7 in the third region 96. To this end, a "sealing member 28/channel element 72/first element 7 sub-assembly" is pre-assembled outside the second element 9. FIG. 4 shows the insertion of this sub-assembly in the portion 109 along the arrows.

It can further be seen that the second element 9 is now at the inner circumference no longer configured in a stepped manner, but instead has only a portion 109 having a diameter for this sub-assembly.

The first element 7 has at the circumference of the annular collar 38 a support ring 122 against which the channel element 72 abuts and which protrudes at the end face. The support ring 122 now has the receiving member 120 for the sealing member 28. The sealing member 28 is retained between the first element 7 and the channel element 72. The support ring 122 is arranged at the circumference of the annular collar 38 and is arranged coaxially relative to the longitudinal center axis Z. Between the annular collar 38 and support ring 122 there is formed an annular space 124 which at least partially guides or forms the channel 10. The annular space 124 is additionally delimited by the sealing member 28.

The channel element 72 additionally comprises the central space 114 which is delimited at the outer circumference by the passage 102 or the support ring 122, at the inner circumference by the annular collar 38, axially at one end by the sealing member 28 and axially at the other end by the first element 7.

Figure 5:
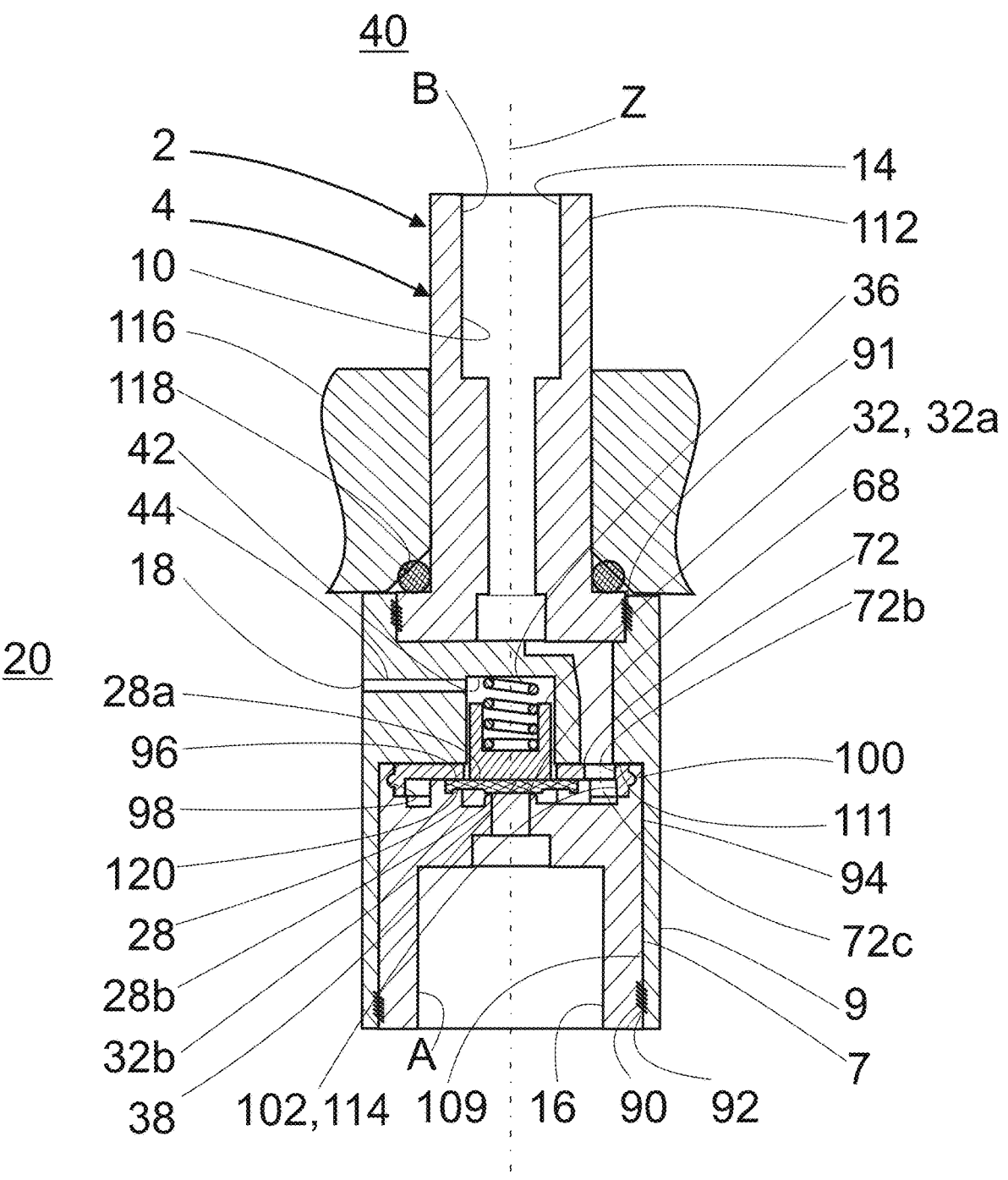

In FIG. 5, the valve 2 which is finally produced or mounted is shown in a third embodiment as a pressure retention valve.

This sub-assembly can then subsequently be arranged or inserted in the portion 109 of the second element 9. The sub-assembly can arrive in an end position as soon as the first element 7 moves into abutment with a face 111 of the second element 9. In this end position, the channel element 72 and the second element 9 may be in abutment with each other in a pressure-free manner. The clamping force, which has already been determined beforehand during the sub-assembly pre-assembly, of the sealing member 28 is thereby not changed.

It is now shown that, after completed positioning against the face 111, the first element 7 is welded to the second element 9. The weld seam 90 is thereby formed.

Pre-assembly is intended to be understood to be an operation by means of which a sub-assembly per se is completely produced. After pre-assembly, the sub-assembly per se may be complete. Assembly is intended to be understood to be an operation by means of which components or sub-assemblies is/are secured on or in their operational destination in order to form a valve 2.

The invention is not limited to one of the above-described embodiments, but can instead be modified in various ways. All of the features and advantages derived from the claims, the description and the drawing, including structural details, spatial arrangements and method steps, may be significant to the invention both per se and in extremely varied combinations.

All the combinations of at least two of the features disclosed in the description, the claims and/or the Figures are included within the scope of the invention.

In order to avoid repetition, features disclosed according to the apparatus should also be considered to be disclosed and claimable in accordance with the method. Features disclosed according to the method should also be considered to be disclosed and claimable according to the apparatus.

The invention claimed is:

1. A valve for an air spring, comprising a housing member through which a longitudinal center axis extends and which comprises a channel, wherein the housing member comprises a first element and a second element connected by a material bond connection in a first region and which are in abutment with each other in a second region or which are arranged directly beside each other, wherein there is provided in the channel a sealing member which can close the channel or reduce an effective opening cross section of the channel, wherein the valve comprises a channel element, which at least partially guides or forms the channel, wherein the channel element is fixed in the housing member in a form-fit and/or force-fit manner and the channel element retains the sealing member in a third region between the channel element and the second element or the channel element is fixed in or on the first element in a form-fit and/or force-fit manner and the channel element retains the sealing member in a third region between the channel element and the first element, wherein the channel element at least on one of an outer side thereof has a locking groove or a locking projection and a fixing partner for the channel element has the other element from the locking groove and locking projection, wherein the locking groove and locking projection engage in each other in a fixing manner, such that the sealing member is thereby retained in the third region.

2. The valve according to claim 1, wherein the channel element is constructed in a disc-like or annular manner.

3. The valve according to claim 1, wherein the locking groove is a circle-segment-like groove, and/or the locking projection is a circle-segment-like locking projection.

4. The valve according to claim 1, wherein the second element has an internally circumferential first portion having a first diameter in which the first element is provided in abutment against a first surface, and/or the second element has an internally circumferential second portion having a second diameter in which the channel element is provided in abutment against a second surface.

5. The valve according to claim 4, wherein the channel element is recessed in a direction of the longitudinal center axis with respect to the first surface or at most is flush therewith and/or both elements abut each other in a pressure-free manner in the second region, and/or the first element and the channel element abut each other in a pressure-free manner.

6. The valve according to claim 1, wherein the channel element has a central space which at least partially forms or guides the channel and which is open with respect to the first or second element, and which is disposed coaxially relative to the longitudinal center axis.

7. A method for producing a valve of claim 1, comprising:
   providing the first element, the second element, the sealing member, and the channel element;
   connecting, in the form-fit and/or force-fit manner, the channel element to one of the first element and the second element such that the sealing member is retained between the channel element and the corresponding one of the first element and the second element in the third region; and, connecting the other element of the first element and the second element to the element to which the channel element is connected by the material bond connection in the first region;

wherein the first element and the second element are in abutment with each other in the second region or are disposed directly adjacent to each other.

8. A valve for an air spring, comprising a housing member through which a longitudinal center axis extends and which comprises a channel, wherein the housing member comprises a first element and a second element connected by a material bond connection in a first region and which are in abutment with each other in a second region or which are arranged directly beside each other, wherein there is provided in the channel a sealing member which can close the channel or reduce an effective opening cross section of the channel, wherein the valve comprises a channel element, which at least partially guides or forms the channel, wherein the channel element is fixed in the housing member in a form-fit and/or force-fit manner and the channel element retains the sealing member in a third region between the channel element and the second element or the channel element is fixed in or on the first element in a form-fit and/or force-fit manner and the channel element retains the sealing member in a third region between the channel element and the first element, wherein the channel element has a passage via which or in which an annular collar protrudes, and wherein the annular collar has a sealing face adjoining the sealing member.

9. The valve according to claim 8, wherein the channel element has at least at one of an outer side thereof a channel portion which guides or forms the channel and/or the channel element with respect to the longitudinal center axis.

10. The valve according to claim 8, wherein the channel element is constructed in a disc-like or annular manner.

11. The valve according to claim 8, wherein the second element has an internally circumferential first portion having a first diameter in which the first element is provided in abutment against a first surface, and/or the second element has an internally circumferential second portion having a second diameter in which the channel element is provided in abutment against a second surface.

12. The valve according to claim 11, wherein the channel element is recessed in a direction of the longitudinal center axis with respect to the first surface or at most is flush therewith and/or both elements abut each other in a pressure-free manner in the second region, and/or the first element and the channel element abut each other in a pressure-free manner.

13. A method for producing a valve of claim 8, comprising:

providing the first element, the second element, the sealing member, and the channel element;

connecting, in the form-fit and/or force-fit manner, the channel element to one of the first element and the second element such that the sealing member is retained between the channel element and the corresponding one of the first element and the second element in the third region; and, connecting the other element of the first element and the second element to the element to which the channel element is connected by the material bond connection in the first region;

wherein the first element and the second element are in abutment with each other in the second region or are disposed directly adjacent to each other.

\* \* \* \* \*